(12) United States Patent
Shirai (10) Patent No.: US 7,855,851 B2
(45) Date of Patent: Dec. 21, 2010

(54) STORAGE DEVICE

(75) Inventor: Katsumi Shirai, Kawasaki (JP)

(73) Assignee: Toshiba Storage Device Corporation, Toky (JP)

( * ) Notice: Subject to any disclaimer, the term of this patent is extended or adjusted under 35 U.S.C. 154(b) by 10 days.

(21) Appl. No.: 12/414,408

(22) Filed: Mar. 30, 2009

(65) Prior Publication Data

US 2010/0246055 A1 Sep. 30, 2010

(51) Int. Cl.
*G11B 5/596* (2006.01)

(52) U.S. Cl. .................. 360/77.04; 360/77.02

(58) Field of Classification Search ......... None
See application file for complete search history.

(56) References Cited

U.S. PATENT DOCUMENTS

| | | | |
|---|---|---|---|
| 6,856,660 B1 | 2/2005 | Watanabe et al. | |
| 7,027,256 B1 * | 4/2006 | Subrahmanyam et al. | 360/77.08 |
| 2005/0190480 A1 * | 9/2005 | Mori et al. | 360/60 |
| 2007/0139811 A1 * | 6/2007 | Ohinata et al. | 360/77.04 |

FOREIGN PATENT DOCUMENTS

| JP | A 60-117461 | 6/1985 |
|---|---|---|
| JP | A 2000-100084 | 4/2000 |
| JP | A 2007-80388 | 3/2007 |

* cited by examiner

*Primary Examiner*—Andrew L Sniezek
(74) *Attorney, Agent, or Firm*—Greer, Burns & Crain, Ltd.

(57) ABSTRACT

A magnetic disk device includes a head that reads position information, a position-information correction value for correcting the position information, and an error correcting code for the position-information correction value from a storage medium; a microcontroller unit (MCU) and an error check and correct (ECC) circuit for correcting an error in the position-information correction value based on the error correcting code; and a static var compensator (SVC) that performs position control based on either one of the position-information correction value read by the head and the position-information correction value with the error corrected by the MCU and the ECC circuit, and the position information read by the head so that the head is located at a target position on the storage medium.

4 Claims, 6 Drawing Sheets

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| P | O | O | O | O | O | O | O | O | O | O | O | O | O | O | O | O |
| E1 | | O | | O | | O | | O | | O | | O | | O | | O |
| E2 | | | O | O | | | O | O | | | O | O | | | O | O |
| E4 | | | | | O | O | O | O | | | | | O | O | O | O |
| E8 | | | | | | | | | O | O | O | O | O | O | O | O |

FIG.4

| ERROR ADDRESS | PARITY ERROR | DETERMINATION |
|---|---|---|
| 0 | ABSENT | NORMAL |
| 0 | PRESENT | NORMAL (ERROR ONLY IN PARITY) |
| OTHER THAN 0 | PRESENT | CORRECTABLE ERROR |
| OTHER THAN 0 | ABSENT | NON-CORRECTABLE ERROR |

STORAGE DEVICE

FIELD

The embodiments discussed herein are directed to storage devices, for example, those capable of performing head-position control with high accuracy.

BACKGROUND

In a storage device, such as a magnetic disk device, that has a head for reading and writing data from and into a rotating storage medium, accurate position control of head (hereinafter, position control of head is sometimes simply referred to as "position control") is necessary to read and write data at a target position.

In the magnetic disk device, head-position control is performed based on position information stored in a servo frame and position-information correction values stored in a post code region. A position-information correction value is a correction value determined based on, for example, the result of Repeatable Run Out (RRO) measurement. In recent years, with the improvement in recording density of the magnetic disk device, a track width tends to be narrower. Therefore, correcting the position of the head with high accuracy based on the position-information correction values has become increasingly important.

However, the position-information correction values stored in the post code region may be destroyed due to some reason. If any position-information correction value is destroyed, the head-position control cannot be appropriately performed, and therefore a serious failure tends to occur, such as side erase.

To prevent the occurrence of a failure due to destruction of a position-information correction value, a technology of providing a parity bit to the position-information correction values has been known. By using this technology, the position-information correction values can be used to perform position control even if any position-information correction value has been destroyed, thereby avoiding the head from being moved to an erroneous position.

However, the conventional technology using the parity bit explained above has a problem of a decrease in accuracy of position control. The reason for this problem is as follows. In the conventional technology using the parity bit explained above, it is possible to prevent the use of the destroyed position-information correction value for position control. However, when a position-information correction value is destroyed, position control is performed based on only the position information.

SUMMARY

According to an aspect of the invention, a storage device includes a head that reads position information, a position-information correction value for correcting the position information, and an error correcting code for the position-information correction value from a storage medium; an error correcting unit that corrects an error in the position-information correction value using the error correcting code; and a control unit that performs position control based on either one of the position-information correction value read by the head and the position-information correction value with the error corrected by the error correcting unit, and the position information read by the head so that the head is located at a target position on the storage medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of the storage device disclosed herein is explained in detail below based on the drawings. In the following embodiment, an example is explained in which the technology disclosed herein is applied to a magnetic disk. However, the technology disclosed herein can also be applied to other storage devices, such as an optical disk device and a magneto-optical disk device. It should be noted that the present invention is not limited to the following embodiment.

Figure 1:
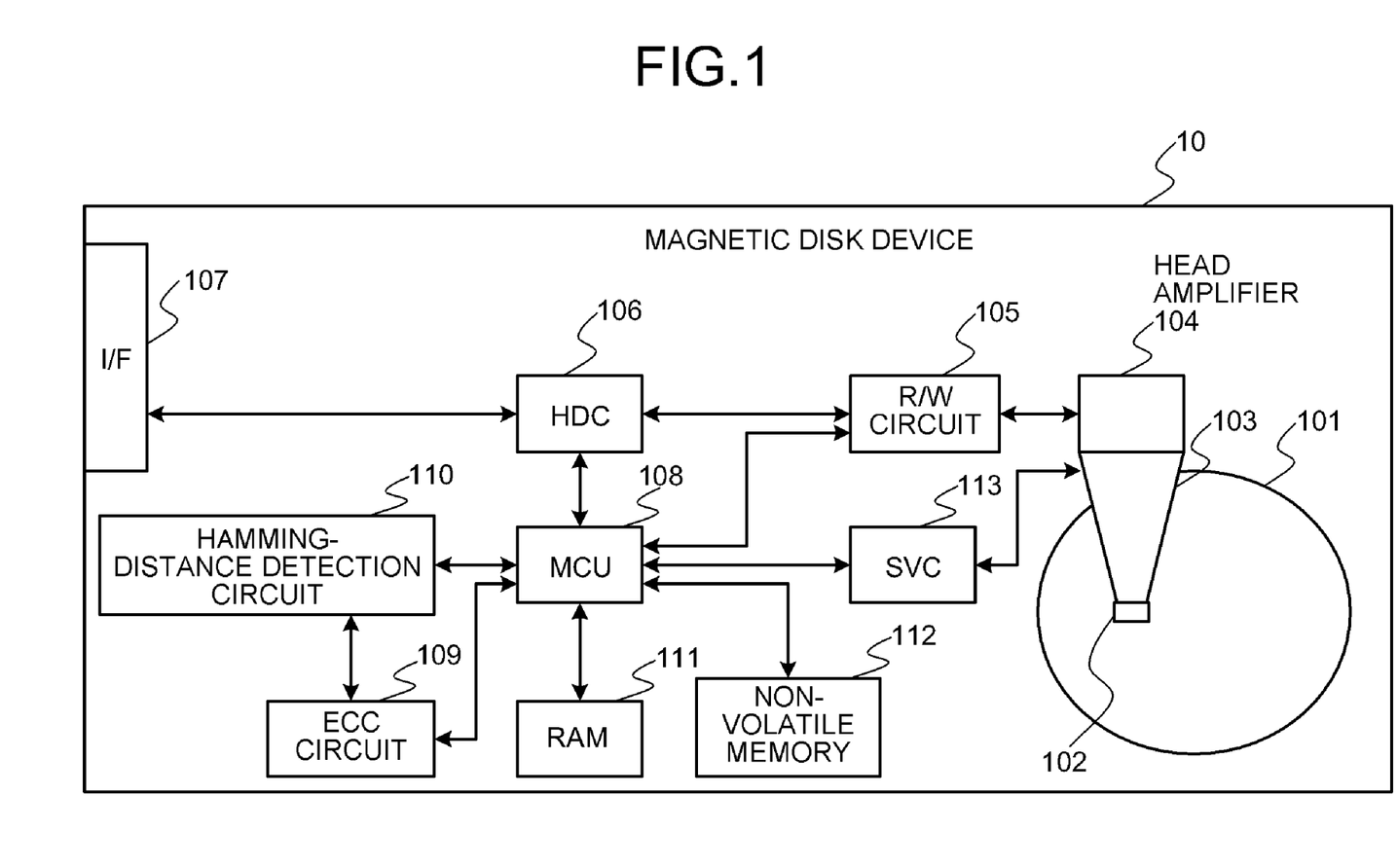
FIG. 1 is a block diagram of the configuration of a magnetic disk device according to an embodiment.

First, the configuration of a magnetic disk device 10 according to the present embodiment is explained. FIG. 1 is a block diagram of the configuration of the magnetic disk device 10 according to the present embodiment. As depicted in FIG. 1, the magnetic disk device 10 includes a storage medium 101, a head 102, an actuator 103, a head amplifier 104, a read/write (R/W) circuit 105, a hard disk controller (HDC) 106, an interface (I/F) 107, a Micro Controller Unit (MCU) 108, an Error Correcting Code (ECC) circuit 109, a Hamming-distance detection circuit 110, a Random Access Memory (RAM) 111, a non-volatile memory 112, and a servo controller (SVC) 113.

The storage medium 101 is a disk-shaped medium having information magnetically stored therein. The storage medium 101 has a storage region, which is divided into concentric regions called tracks, each of which has servo frames for position control, other than a data region having user data stored therein.

Figure 2:
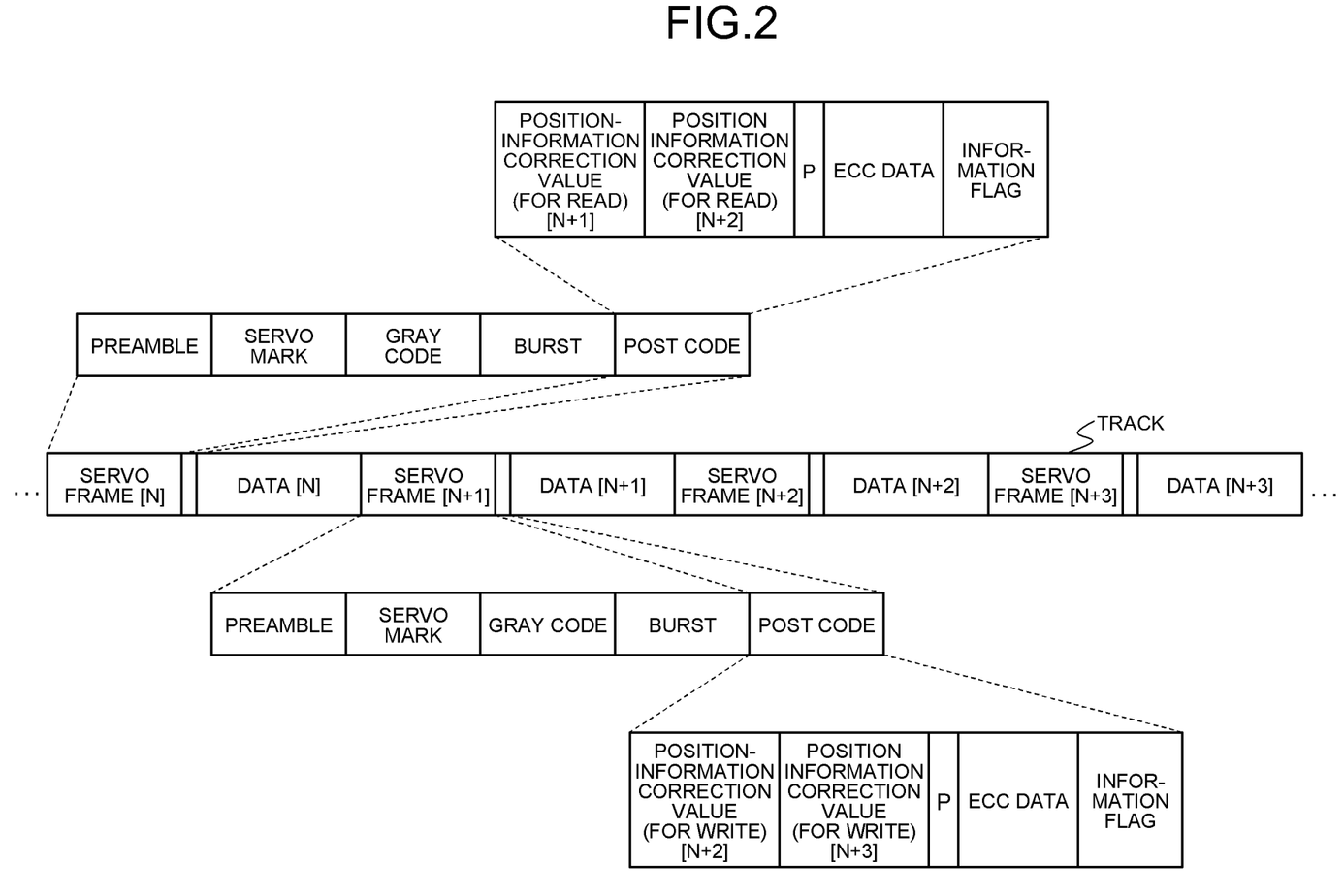
FIG. 2 is a drawing of the configuration of a track.

The configuration of a track of the storage medium 101 is now explained with reference to FIG. 2. As depicted in FIG. 2, a plurality of servo frames are present on a track. While the head is positioned on any of the servo frames, head-position control is performed based on position information read from that servo frame.

The servo frame contains a preamble, a servo mark, a gray code, and a burst. The preamble has stored therein a pattern for synchronization. The servo mark has stored therein a pattern indicative of the start of the servo frame. The gray code has stored therein a servo-frame number and a track number of the track containing that servo frame. The burst has stored therein position information for position control.

Between each servo frame and a data region, a post code region is provided. The post code region contains two position-information correction values, a parity bit, ECC data, and an information flag for a variety of uses.

The position-information correction value stored in the storage medium 101 includes two types: value for read and value for write. In a post code region immediately subsequent to each servo frame of the storage medium 101, two position-information correction values for read or two position-information correction values for write, that are used on the subsequent two servo flames, are stored, which come alternately for each post region.

For example, in a post code region immediately subsequent to a servo frame [N] ("servo frame [N]" means an N-th servo frame), two position-information correction values for read are stored, that is, a position-information correction value (for read) [N+1] and a position-information correction value (for read) [N+2]. The position-information correction value (for read) [N+1] is used for position control together with position information stored in a servo frame [N+1] at the time of performing a read process. Also, the position-information correction value (for read) [N+2] is used for position control together with position information stored in a servo frame [N+2] at the time of performing a read process.

In a post code region immediately subsequent to the servo frame [N+1], two position-information correction values for write are stored, that is, a position-information correction value (for write) [N+2] and a position-information correction value (for write) [N+3]. The position-information correction value (for write) [N+2] is used for position control together with position information stored in the servo frame [N+2] at the time of performing a write process. Also, the position-information correction value (for write) [N+3] is used for position control together with position information stored in a servo frame [N+3] at the time of performing a write process.

The parity bit and ECC data stored in the post code region are used to detect an error in the two position-information correction values stored in the same post code region and to correct the error. As such, by adding the ECC data to the position-information correction values, it is possible to not only detect an error in the position-information correction values but also correct the error in the position-information correction values. Accordingly, the magnetic disk device 10 according to the present embodiment can correct an error even when any of the position-information correction values is destroyed, thereby performing position control with high accuracy.

Referring back to FIG. 1, the head 102 reads and writes data from and into the storage medium 101. The actuator 103 causes the head 102 mounted at the tip to be positioned on a desired track. Position control over the head 102 is achieved by driving the actuator 103 based on the position information and the position information correction values.

The head amplifier 104 amplifies a signal read by the head 102 from the storage medium 101. The R/W circuit 105 performs processes of, for example, modulating and demodulating data to be read and written. The HDC 106 interprets a command received from a host via the I/F 107 to request the MCU 108 and the R/W circuit 105 to perform a process corresponding to that command as required. Then, upon completion of the process corresponding to the command, the HDC 106 responds to the host with the result in a predetermined format via the I/F 107. The I/F 107 electrically connects the magnetic disk device 10 and the host together.

The MCU 108 performs various controls. For example, when position-information correction values are read by the head 102, the MCU 108 causes the ECC circuit 109 to determine whether there is an error in any of the position-information correction values. If it is determined that there is a correctable error, the MCU 108 corrects a bit where the error in the position-information correction value has been detected. If it is determined that there is no error or when an error has been corrected, the MCU 108 instructs the SVC 113 to perform position control based on the position-information correction value and position information read from the subsequent servo frame.

Also, in a process of manufacturing the magnetic disk device 10, the MCU 108 causes the HDC 106 to perform RRO measurement, and delivers position-information correction values generated based on the result of RRO measurement to generate ECC data and a parity bit. The position-information correction values are generated by performing Fast Fourier Transform (FFT) on the RRO measurement result, performing vector transform, and further performing inverse FFT. Then, the MCU 108 causes the generated ECC data and parity bit to be written in the post code region together with the corresponding position-information correction value.

In place of the MCU 108, other types of computing circuit may be used, such as a Central Processing Unit (CPU) or a Micro Processing Unit (MPU).

The ECC circuit 109 generates ECC data and a parity bit corresponding to the position-information correction values and detects an error in the position-information correction values by using the ECC data and the parity bit. The Hamming-distance detection circuit 110 detects a Hamming distance between pieces of input data.

Figure 3:
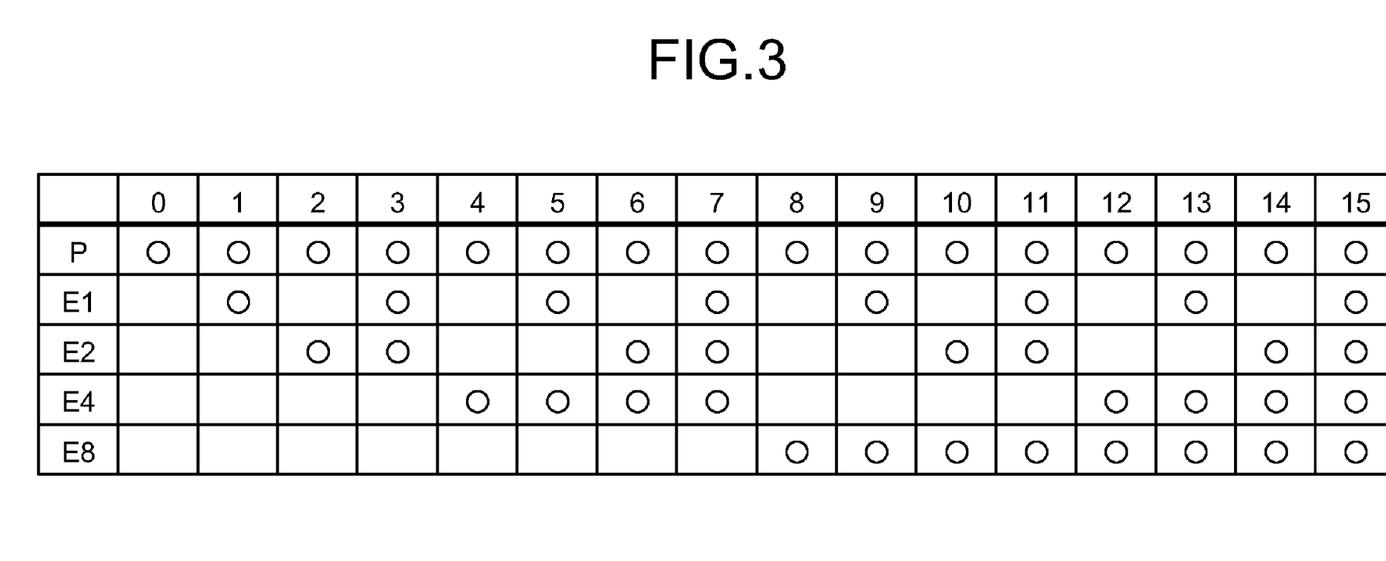
FIG. 3 is a drawing of an example of a method of generating ECC data and a parity bit.

Generation of ECC data and a parity bit is now explained with reference to FIG. 3. It is assumed herein that, for generation-target data of 16 bits with two position-information correction values of 8 bits being combined together, ECC data of 4 bits formed of E1, E2, E4, and E8 and a parity bit are generated.

For E8, since bits relating to E8 are bit 8 to bit 15, the AND operation result between generation target data and 0xFF00 is input to the Hamming-distance detection circuit 110 together with data of 16 bits with all "0". If the Hamming distance indicates an even number, E8 is taken as "1". Otherwise, E8 is taken as "0". As such, E4, E2, and E1 and parity bits are similarly found.

In this manner, the ECC circuit 109 uses the Hamming-distance detection circuit 110 in generation of ECC data. The ECC circuit 109 also uses the Hamming-distance detection circuit 110 for the purpose of parity check and others even at the time of error detection. Since the Hamming-distance detection circuit 110 is conventionally often implemented on a magnetic disk device for the purpose of parity check or others, the use of the function of such an existing Hamming-distance detection circuit 110 can reduce the circuitry size of the ECC circuit 109.

Figure 4:
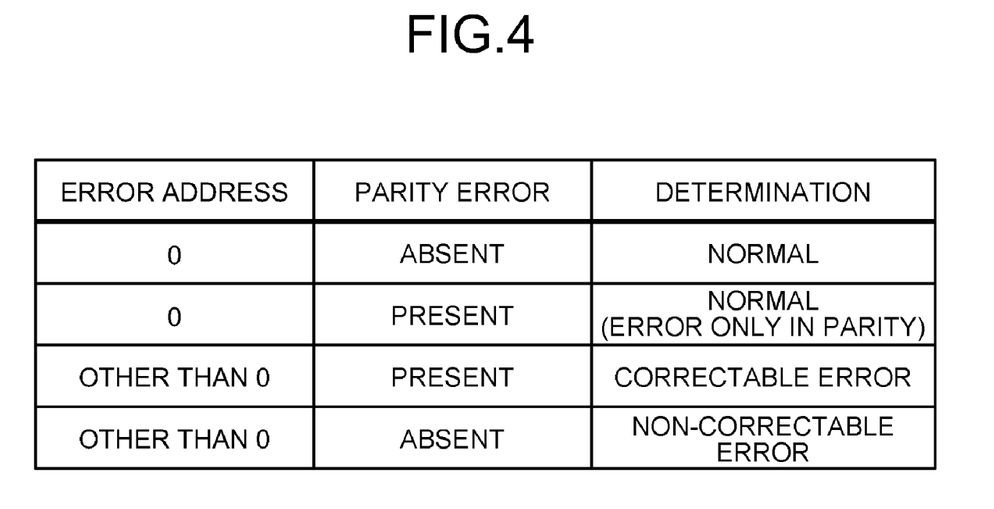
FIG. 4 is a drawing of an error decision logic.

An error determination logic based on the verification result by the ECC circuit 109 is now explained with reference to FIG. 4. As depicted in FIG. 4, when no erroneous bit or parity error is found through verification with the ECC data, it is determined that the position-information correction values are normal.

When a parity error is found even if no erroneous bit is found through verification with the ECC data, it is regarded that the parity bit has an error and the position-information correction values are normal. In the conventional technology where an error is detected with only the parity bit, when only the parity bit has an error, an erroneous determination is made such that any of the position-information correction values has an error. By contrast, in the magnetic disk device 10 according to the present embodiment, such an erroneous determination can be avoided.

Also, when an erroneous bit is detected through verification with the ECC data and a parity error is detected, it is determined that a correctable error has occurred. When the erroneous bit is detected through verification with the ECC data and no parity error is detected, it is determined that a non-correctable error has occurred.

The RAM 11 has temporarily stored therein data to be used by the MCU 108 for various controls. For example, in the process of manufacturing the magnetic disk device 10, the position-information correction values generated based on the RRO measurement result and other results are temporarily stored in the RAM 111. Also, at the time of operation of the magnetic disk device 10, the position-information correction values read from the post code region are temporarily stored in the RAM 111.

The non-volatile memory 112 has stored therein various information regarding the operation of the magnetic disk device 10. For example, when an error-non-correctable position-information correction value is found, a servo frame immediately previous to the post code region having stored therein that position-information correction value is registered in the non-volatile memory 112 as a skip area. Then, the position-information correction value stored in a post code region immediately subsequent to the servo frame registered as a skip area is out of use for position control.

The SVC 113 controls the actuator 103 based on an instruction from the MCU 108 so that the head 102 is accurately located at a target position.

Next, the process procedure of the magnetic disk device 10 according to the present embodiment is explained. It is assumed herein for simplification that there is no distinction between "for read process" and "for write process" among the position-information correction values.

Figure 5:
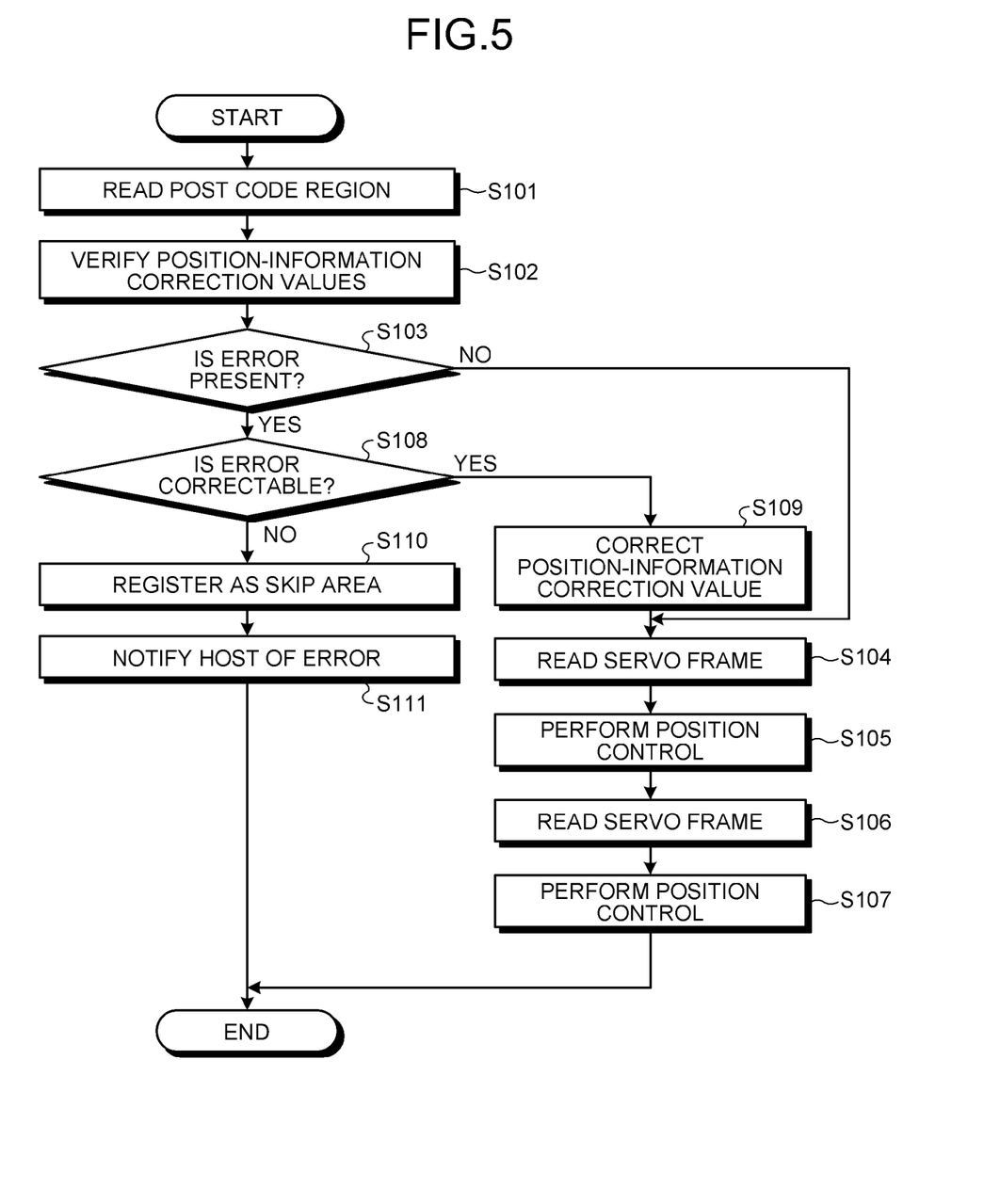
FIG. 5 is a flowchart of procedure for position control.

FIG. 5 is a flowchart of procedure for position control in the magnetic disk device 10. This process procedure is repeatedly performed while causing the head to follow a specific track for a write process or read process.

As depicted in FIG. 5, the head 102 reads position-information correction values, ECC data, a parity bit, and others from a post code region (Step S101). Then, the MCU 108 instructs the ECC circuit 109 to verify the position-information correction values by using the ECC data and the parity bit (Step S102).

When it is determined at Step S102 that there is no error (No at Step S103), position control is performed. Specifically, when position information is read by the head 102 from the subsequent servo frame (Step S104), the MCU 108 instructs the SVC 113 to perform position control by using that position information and one of the position-information correction values (Step S105). Then, when position information is read by the head 102 from a further subsequent servo frame (Step S106), the MCU 108 instructs the SVC 113 to perform position control by using that position information and the other one of the position-information correction values (Step S107).

On the other hand, at Step S102, when it is determined that an error is present (Yes at Step S103) and when the error is correctable (Yes at Step S108), the MCU 108 corrects a bit of a position-information correction value determined as having an error (Step S109). After error correction, position control from Steps S104 to S107 is performed.

When the detected error is not correctable (No at Step S108), a servo frame immediately previous to the post code region that has stored therein a position-information correction value in which the error is detected is registered in the non-volatile memory 112 as a skip area (Step S110). The MCU 108 then makes an instruction for notifying the host that a non-correctable error has occurred (Step S111).

Figure 6:
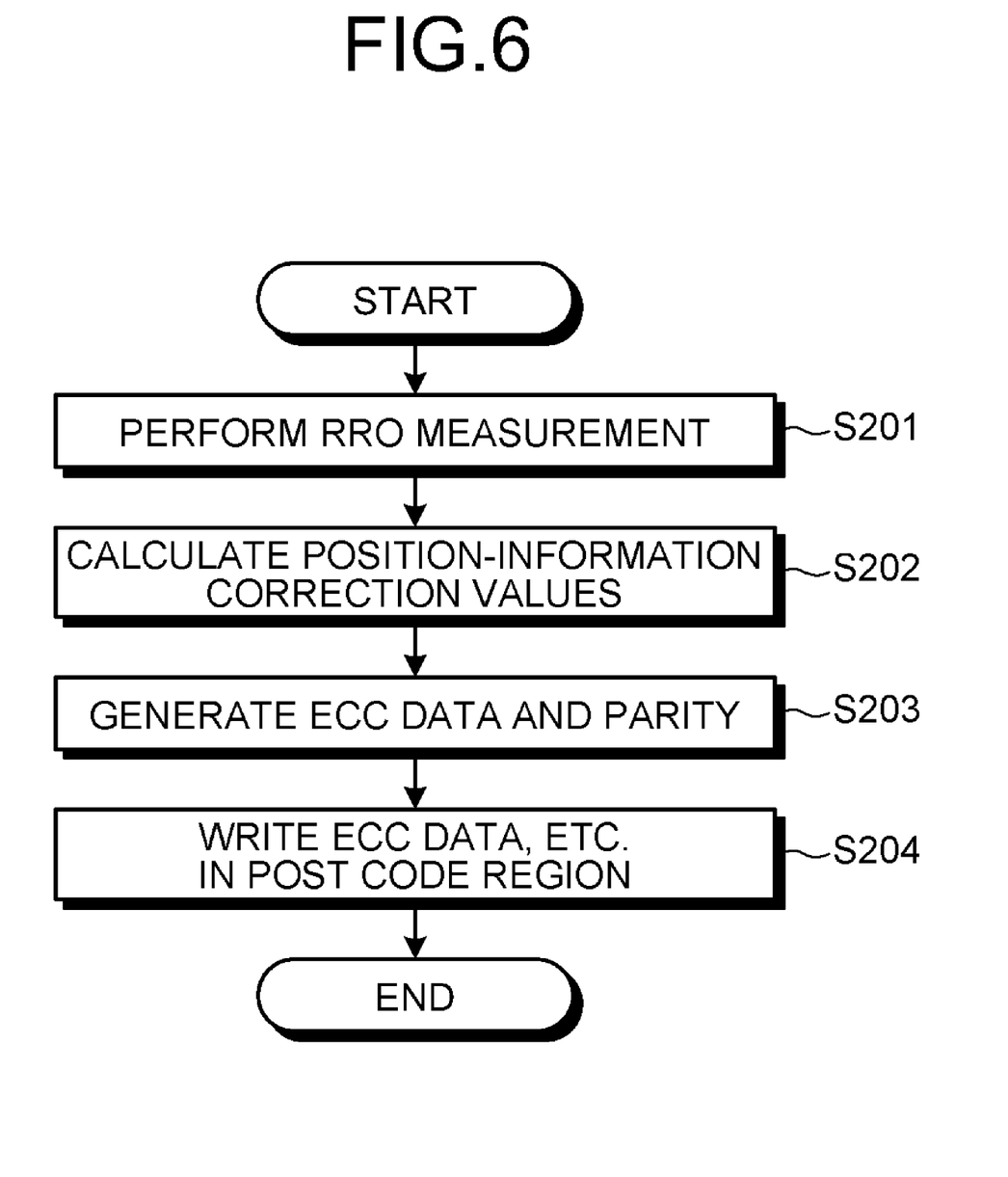
FIG. 6 is a flowchart of procedure for generating position-information correction values.

FIG. 6 is a flowchart of procedure for generating position-information correction values. This procedure is performed in the process of manufacturing the magnetic disk device 10.

As depicted in FIG. 6, the MCU 108 causes the HDC 106 to perform RRO measurement (Step S201), and calculates position-information correction values based on the measurement result and others (Step S202). The MCU 108 then causes the ECC circuit 109 to generate ECC data and a parity bit corresponding to the position-information correction values (Step S203). The MCU 108 then causes the generated ECC data and parity bit to be written in a predetermined post code region together with the position-information correction values (Step S204).

The procedure for generating position-information correction values depicted in FIG. 6 is similar to the conventional procedure for generating position-information correction values, except that a process of generating ECC data and a parity bit is added. Also, the process of generating ECC data and a parity bit is performed by the ECC circuit 109 within an extremely short time. Therefore, the procedure for generating position-information correction values depicted in FIG. 6 is completed within a time period almost equal to a time period required for the conventional procedure for generating position-information correction values.

As has been explained in the foregoing, in the present embodiment, ECC data is added to the position-information correction values and stored in the storage medium. When any of the read position-information correction values has an error, the position-information correction value is corrected by using the ECC data. Therefore, even when a position-information correction value has an error, head-position control can be performed with high accuracy.

Note that the configuration of the magnetic disk device 10 according to the present embodiment can be variously modified without deviating from the gist of the technology disclosed herein. For instance, while the ECC circuit 109 generates ECC data and detects and corrects an error by using the ECC data in the example explained above, these processes may be performed by the MCU 108. In this case, the MCU 108 achieves functions of, for example, error correction, by executing firmware stored in advance.

Also, while a post code region is provided between a servo frame and a data region in the example, the post code region may be provided at a different position. Furthermore, while two position-information correction values are stored in each post code region in the example, the number of position-information correction values stored in each post code region is not limited to two.

Still further, while the information about the skip area is stored in the non-volatile memory 112 in the example, the information about the skip area may be stored in the storage medium 101. Still further, when the number of pieces of information about skip areas, that is, the number of error-non-correctable position-information correction values, exceeds a predetermined number, a position-information correction value of a relevant track may be regenerated at the time of idling.

According to an embodiment of the storage device disclosed herein, an effect of performing head-position control with high accuracy can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage device comprising:
a head that reads position information, a position-information correction value for correcting the position information, and an error correcting code for the position-information correction value from a storage medium;
an error correcting unit that corrects an error in the position-information correction value using the error correcting code; and
a control unit that performs position control based on either one of the position-information correction value read by the head and the position-information correction value with the error corrected by the error correcting unit, and the position information read by the head so that the head is located at a target position on the storage medium, wherein
when the error in the position-information correction value read by the head cannot be corrected, the error correcting unit causes a storage unit to store information that prevents the position-information correction value from being used for position control.

2. The storage device according to claim 1, wherein
the head reads from the storage medium a parity bit for detecting an error in the position information, and
the error correcting unit determines based on the error correcting code and the parity bit whether the position-information correction value read by the head has an error.

3. The storage device according to claim 1, wherein the error correcting code is generated for each combination of a plurality of position-information correction values.

4. The storage device according to claim 1, wherein the error correcting unit uses a Hamming-distance detection circuit to determine whether the position-information correction value read by the head has an error.

* * * * *